US005083155A

United States Patent [19]

Kataoka et al.

[11] Patent Number: 5,083,155

[45] Date of Patent: Jan. 21, 1992

[54] CARTRIDGE FOR DEVELOPED PHOTOGRAPHIC FILM

[75] Inventors: Hideaki Kataoka; Nakao Oi, both of Kanagawa, Japan

[73] Assignee: Fuji Photo Film Co., Ltd., Kanagawa, Japan

[21] Appl. No.: 584,017

[22] Filed: Sep. 18, 1990

[30] Foreign Application Priority Data

Sep. 18, 1989 [JP] Japan ................................ 1-240978

[51] Int. Cl.[5] ...................... G03B 27/62; G03B 17/26; G03B 1/04

[52] U.S. Cl. .................................... 355/75; 242/71.1; 354/275

[58] Field of Search .......................... 355/75; 354/275; 242/197, 199, 71.1

[56] References Cited

U.S. PATENT DOCUMENTS 4,188,115 2/1980 Marvin ................................ 355/75

4,482,232 11/1984 Engelsmann et al. ............. 354/275

*Primary Examiner*—Richard A. Wintercorn
*Attorney, Agent, or Firm*—Sughrue, Mion, Zinn, Macpeak & Seas

[57] ABSTRACT

A developed photographic film is contained in a cartridge such that the leader end of the photographic film does not protrude from the cartridge, the film being wound on a spool. In one embodiment, the cartridge has a notch formed in the side of a port portion. The photographic film is pushed out of the cartridge by a sprocket accessed to this notch when extra prints are made. In another embodiment, two roll chambers are connected with each other through a bridge portion having an aperture for exposing a picture frame. A further embodiment includes a splice tape connected at one end to the spool, the photographic film being connected to the spool through this splice tape. These respective embodiments can also be used as a container for containing an unexposed photographic film.

22 Claims, 5 Drawing Sheets

CARTRIDGE FOR DEVELOPED PHOTOGRAPHIC FILM

BACKGROUND OF THE INVENTION

This invention relates to a cartridge for keeping or storing a developed photographic film easily and conveniently, and particularly to a cartridge which can be used suitably both as a photographing cartridge for storing an unexposed photographic film and as a storage cartridge for storing a developed photographic film.

Unexposed 135 type photographic film strips, for example, negative film strips (hereinafter simply referred to as the "negative film") are stored in a light tight cartridge. After photographs have been taken by a camera, the cartridge containing an exposed negative film is taken to a processing laboratory where the film is removed from the cartridge and processed. After photographic processing, each picture frame recorded on this negative film is printed on photographic paper. After printing, the exposed negative film is cut into predetermined lengths for example of six picture frames, and each of the obtained negative pieces is inserted into each pocket of a negative film sheath. The negative film sheath containing the negative film pieces and photoprints are put into a DP envelope and then returned to a user in that state. Similarly, a 120 type negative film, which is wound directly onto a spool without a cartridge, also is cut into proper lengths after being subjected to photographic processing, and each negative piece is contained in a negative film sheath.

Developed negative film returned to the user as a plurality of negative pieces actually is of no use except for making extra prints. Therefore such negative pieces are kept merely as a dead stock or otherwise are scattered. One of the reasons is that they are inconvenient to arrange properly and keep in order. More specifically in order to prevent the picture frames from being applied with a folding line or lines, the negative pieces must be put into a negative film sheath and then kept in that state. Naturally this requires a large, horizontally elongated container. Also, if it is desired to make extra prints, a negative piece having a desired picture frame must be selected first, and then this negative piece must be taken out of the negative film sheath and set in a photographic printer This naturally makes it troublesome to carry out the extra printing work. Furthermore, as the user can easily put the negative film in and take it out of the sheath, there is a fear that the user s fingerprint, dust, scratches, etc. will be attached to the negatives.

On the other hand, the empty cartridge, from which the exposed negative film has been removed, is subjected to disposal. In a large laboratory as a large number of cartridges are left as a result of a large amount of photographic processing, effective utilization of the cartridges is required.

Therefore, it is a main object of the present invention to provide a cartridge capable of properly arranging and keeping developed photographic film in orderly fashion.

Another object of the present invention is to provide a cartridge which makes it easy to handle developed photographic film when the extra printing or the like is performed.

A further object of the present invention is to provide a cartridge which can be used both for storing unexposed photographic film for photographing and for storing developed photographic film in a proper orderly arrangement.

SUMMARY OF THE INVENTION

The above and other objects and advantages of the present invention can be achieved by using the inventive cartridge to be described. This cartridge is designed such that developed photographic film is wound directly onto a spool without being cut and stored in that state. In view of having to make extra prints or the like the construction is improved in order to facilitate transport of the photographic film under such circumstances. In a preferred embodiment of the present invention, a notch for exposing perforations of the developed photographic film is formed in the vicinity of a film passage mouth of the cartridge. A sprocket for transport is engaged with the perforations through this notch in order to advance the developed photographic film from the cartridge. In another embodiment of the present invention, a film advance device advances the developed photographic film when the spool is rotated in the unwinding direction. In a further embodiment of the present invention, the cartridge has two chambers formed therein with an aperture sandwiched therebetween and, when the extra printing is to be effected, a desired picture frame is set in an aperture by transmitting developed photographic film from one chamber to the other. In a still further embodiment of the present invention, in order to facilitate containing a developed photographic film in a cartridge, a tape trailer of a splice tape is attached to a spool, and a developed photographic film is attached to the tape leader (or the tip) of the splice tape which is advanced from the cartridge.

Although the present invention relates to a cartridge for properly arranging and orderly keeping developed photographic film, it is preferable to use the cartridge for storing unexposed film in order to effectively utilize resources. In that case, a cartridge containing the unexposed film is loaded in a camera and a picture is recorded on each frame. In a processing laboratory, the exposed photographic film is removed from the cartridge, and then is developed and printed. After the photographs have been printed, the developed photographic film is loaded again in the cartridge. In case the cartridge is used only for containing developed photographic film, the cartridge preferably is made transparent so that the inside thereof can be seen. However, in case the cartridge is used as both a photographing cartridge and a storing cartridge, the cartridge is required to be formed in a light tight structure in order to prevent exposure of the unexposed photographic film. In that case, as it is necessary to make the cartridge body opaque and apply a light trap function to a film passage mouth, a cartridge having both functions is more expensive than a storing cartridge. However, since the cartridge can be effectively utilized, it still is economical, considering the general circumstances.

According to the present invention, as the cartridge contains a full photographic film in a roll shape, it does not become so bulky as in the conventional envelope containing system, but can be stored in a small space. Also, as the cartridge of the present invention is designed such that the photographic film can be self-fed or protruded, it is convenient for advancement of the film when extra prints are made.

BRIEF DESCRIPTION OF THE DRAWINGS

The above and other objects and advantages will become apparent to those skilled in the art upon reading the detailed description of the preferred embodiments with reference to the accompanied drawings, wherein.

DETAILED DESCRIPTION OF THE PREFERRED EMBODIMENTS

Figure 1:
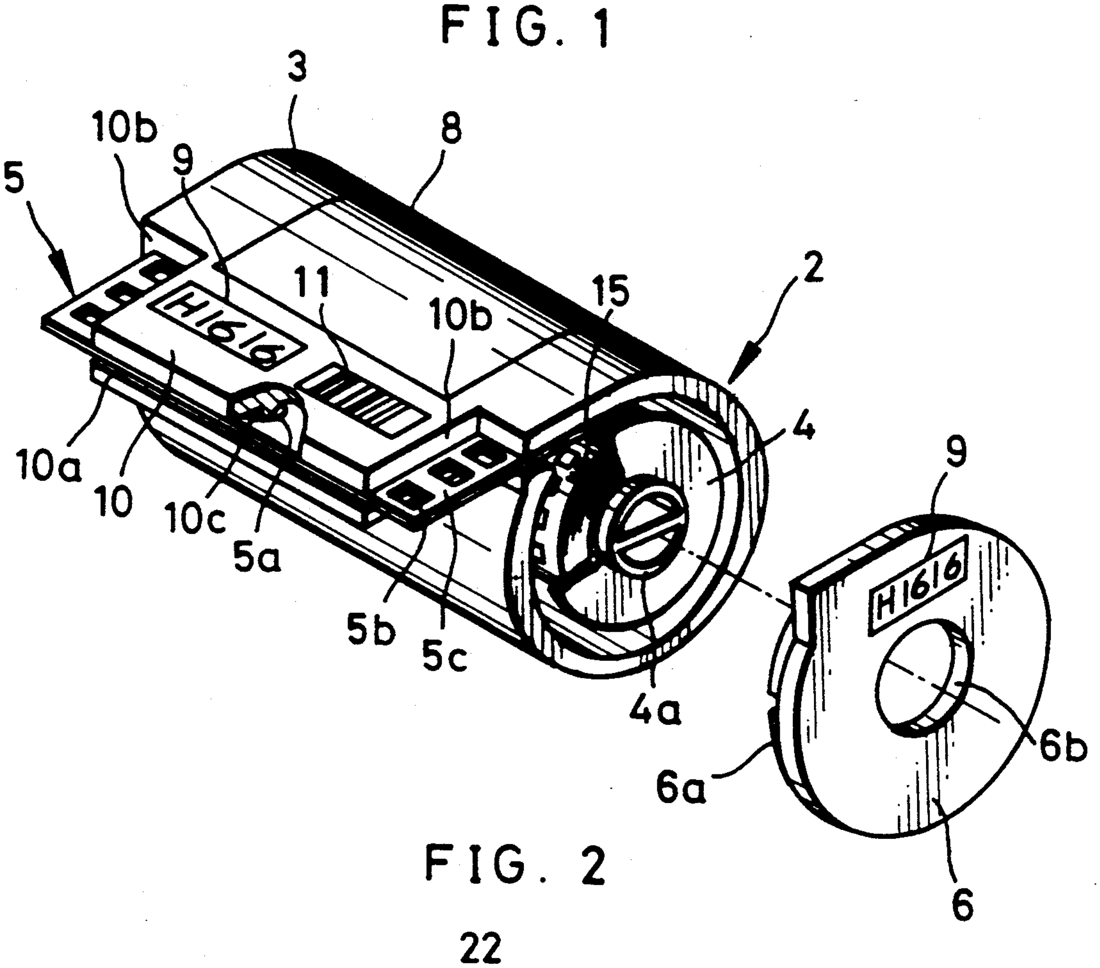
FIG. 1 is a perspective view showing a first embodiment of the present invention.

In FIG. 1 showing a first embodiment of the present invention, a cartridge 2 is constituted by a cartridge body 3 molded of plastic material, a spool 4 rotatably contained in the cartridge body 3, and a developed photographic film wound on the spool 4 with its trailing end fixed to the spool 4. A 135 type negative film having a width of, for example, 35 mm, is used as this developed photographic film. As the cartridge body 3 is intended to contain the developed negative film 5, the body is not necessarily made of light shielding structure and may be, for example, a transparent case. The film cartridge body 3 has a film passage mouth or slit 10*a* formed in a port portion 10 thereof the port portion 10 being provided with a notch 10*b* on each of the two sides thereof. One side of the cartridge body 3 is covered and blocked with a cap 6 which is integral with an engaging piece 6*a*. A shaft hole 6*b* is formed in this cap 6 to support rotatably the shaft portions 4*a* which are disposed at both end portions of the spool 4.

When the developed negative film 5 is returned to a user at a processing laboratory, the developed negative film 5 is stored in the cartridge 2 in accordance with the following procedures. First an exposed negative film is removed from a photographing cartridge (not shown). A large number of strips, for example about 100, of exposed negative film are connected lengthwise with connecting tapes. The resulting elongated exposed negative film is developed by a processor and is sent to a photographic printer where each picture frame is printed on photographic paper. The printed photographic paper is developed and separated into frames, so as to become individual photoprints. On the other hand the elongated negative film is separated back into the original strips, and is provided with a retaining hole 5*a* formed in each leader section 5*c* thereof.

Individually separated developed negative film 5 is retained at its rear end on the spool 4. Thereafter, one side edge of the developed negative film 5 is inserted into the film passage mouth 10*a* so that the spool 4 is inserted into the cartridge body 3 from the side and then the cap 6 is put thereon. The cartridge 2 is put in a winding apparatus (not shown). A rotatable shaft of the winding apparatus is coupled to the spool 4, and the spool 4 is rotated clockwise. As a result, the developed negative film 5 is wound into the cartridge 2.

When the developed negative film 5 is wound into the cartridge 2 and the leader end 5*c* reaches the film passage mouth 10*a*, a retaining claw 3*c* disposed at an inner side of the film passage mouth 10*a* is engaged in a retaining hole 5*a*. As a result, a rotary load of the spool 4 is increased abruptly. When a load detection circuit detects this load increase, the winding operation of the developed negative film 5 is finished in a state where the leader section 5*c* of the developed negative film 5 retained in the film passage mouth 10 by stopping the rotatable shaft. In that state, the perforations 5*b* formed at both side edges of the developed negative film 5 are exposed from the notch 1*b*.

In this way, in a system for returning the developed negative film 5 contained in the cartridge 2 to the user, the developed negative film can be made compact compared with the conventional return system using the negative film sheath, and thus may be stored and arranged conveniently. Further convenience is realized if a seal 8 of a blank surface is attached to the outer surface of the cartridge body 3 so that the user can freely write down photographic records. Also, an ID number seal 9 with an ID number recorded thereon and a bar code seal 11 with this ID number in bar code form are attached to the cartridge body 3.

When using a system for printing the ID number of the developed negative film 5 on rear surfaces of photoprints during photographic printing, it is easy to identify the photoprints to the developed negative film 5. Furthermore, if a bar code seal with printing conditions of each picture frame recorded thereon is attached to the cartridge body 3, the extra photoprints can have the same color balance and the same color density as photoprints which are prepared by so-called simultaneous printing, in which photographic printing also is also effected when photographic processing is requested.

Furthermore, as the winding of a developed negative film 5 in the cartridge body 3 at the processing laboratory can be automated, efficiency of operation after photographic processing can be enhanced and operators at the processing laboratory can be released from such troublesome work as to cut the developed negative film 5 into lengths of six picture frames and then pack the cut lengths in a negative film sheath. Moreover, the negative film can be prevented from scratches and dust during operation.

Figure 2:
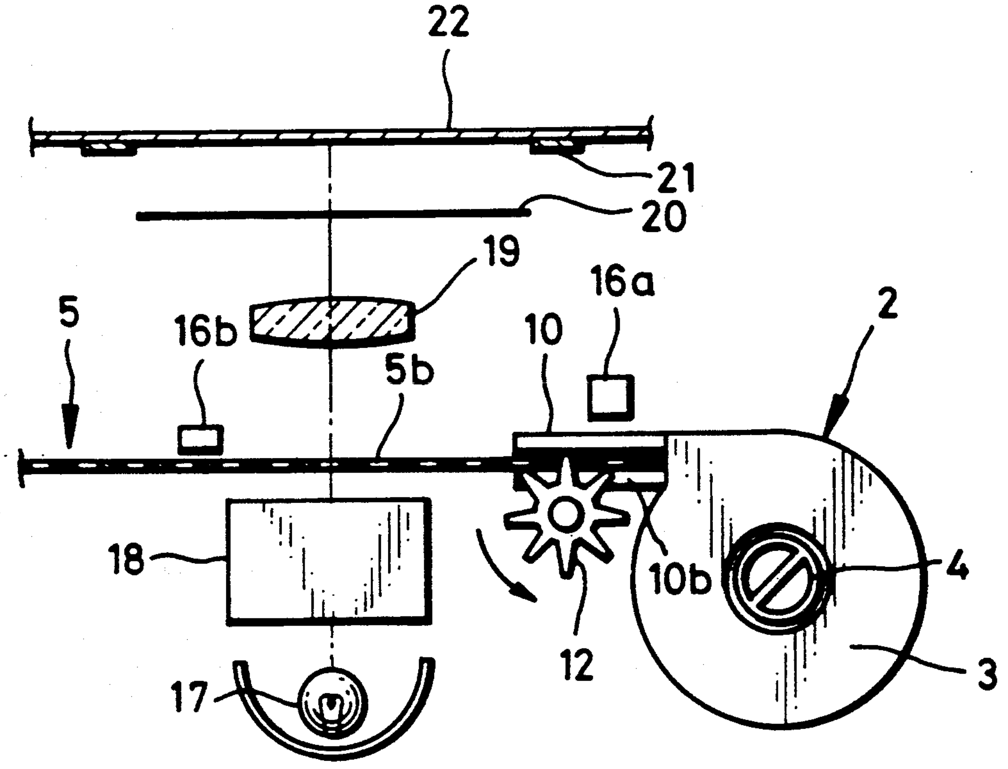
FIG. 2 is a schematic view showing extra printing using the cartridge shown in FIG. 1.

FIG. 2 shows schematically the making of an extra print. At the time of simultaneous printing, the ID number mentioned above, in addition to a shot number or frame number of the picture frame for extra printing is printed on the rear surface of the photoprints. The user selects a cartridge based on the ID number printed on the rear surface of a photoprint for which the extra printing is desired, and identifies a picture frame for which the extra printing is desired with reference to the frame number of the photoprint. When the user places an order for such an extra print, he or she submits to the printing laboratory the cartridge 2 as well as an order sheet covering the details of the extra printing order.

When the cartridge 2 is sent to a photographic printer in the processing laboratory, the sprocket 12 of the photographic printer is engaged with the perforations 5*b* of the developed negative film 5 in the notch 10*b* of the port portion 10. When the sprocket 12 is rotated in a direction as indicated by an arrow, the leader section 5c of the developed negative film 5 is advanced outside the cartridge 2. Such advanced leader section 5c is nipped by a nip roller disposed at a transfer passage formed in a photographic printer and then is transferred to a print station.

Since an edge portion of the developed negative film 5 carries a bar code 15 corresponding to the frame number, a picture frame for which extra prints are to be made is set in the print station by reading the frame number with a bar code reader 16b. Then, printing light from a lamp 17 is adjusted in accordance with the contents of the picture frame by light adjusting device 18 including a dispersing box, a color correcting filter, etc. After this printing light is adjusted, a shutter 20 is actuated to project an image of a picture frame to photographic paper 22 through a printing lens 19 and a framing mask 21. When the extra printing is performed, the bar code seal 11 of the cartridge body 3 is read by a bar code reader 16a to confirm the negative film.

When the cartridge 2 is used to store the developed negative film, it is unnecessary to form the cartridge 2 in a light-tight structure. Rather, it is preferable to make the cartridge body 3 transparent so that its interior can be seen from the outside. However, when effective utilization of the cartridge is taken into consideration, it is desirable that the cartridge also be used as a photographing cartridge. In that case, the cartridge body 3 is made of an opaque plastic material, and plush is provided in the film passage mouth 10a to form a light trap. Furthermore, the engaging portion 6a between the cap 6 and the case body 3 is light-shielded. Light shielding also is provided between a hole 6b formed in the cap 6 and the spool 4. By containing the unexposed film in the light-tight cartridge 2, it can be used as a 135 type negative film cartridge which is commercially available at present. After photographs have been taken by a camera, the exposed negative film is removed from the cartridge, and a developed negative film is put into the empty cartridge 2.

Figure 3:
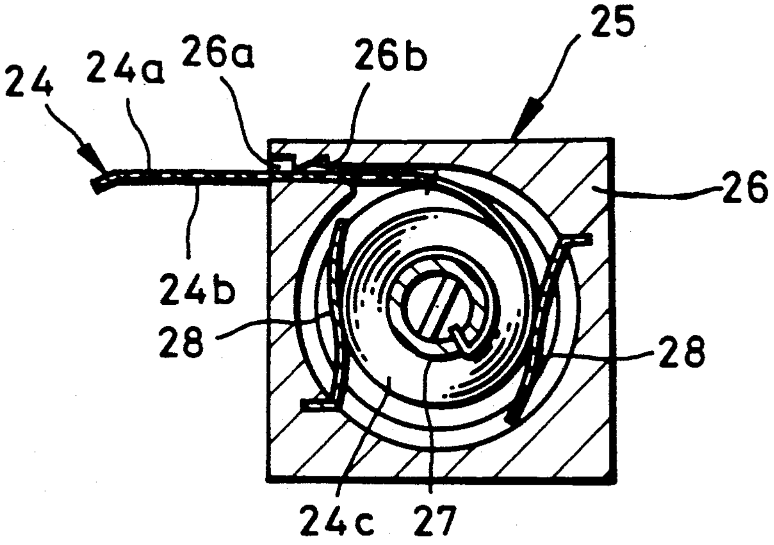
FIG. 3 is a sectional view of an important portion showing a second embodiment of the present invention.

In FIG. 3. which shows a second embodiment of the present invention, a cassette 25 is constituted by a substantially rectangular parallelepipedic cassette body 26, a spool 27 on which a developed negative film 24 is wound and which is contained rotatably in the cartridge body 26, and a resilient member 28, one end of which is fixed to the interior of the cartridge body 26. A metal or plastic elongated plate is used as this resilient member 28. The resilient member 28 is disposed in such a manner as to sandwich the film roll 24c from both sides thereof at both end portions of the spool 27. A slit-shaped film passage mouth 26a, provided at its inner side with a retaining claw 26b, is formed in the cartridge body 26.

The resilient member 28 contacts the outermost periphery of the film roll 24c wound on the spool 27 to press the film roll 24c, thereby to prevent the film roll 24c from being loosened from the spool 27. Accordingly, at the time the above-mentioned extra printing is performed, when the spool 27 is rotated counterclockwise, its rotating force is transmitted immediately to the outermost periphery of the film roll 24c, and the film leader 24a can be protruded reliably from the film passage mouth 26a. Also, when the developed negative film 24 is taken up into the cartridge 25 the spool 27 may be rotated clockwise. When the developed negative film 24 has been wound into the cartridge 25, the retaining claw 26b is engaged with the perforations 24b. In order to engage the retaining claw 26b reliably with the perforations 24b, the film leader 24a is bent slightly, as shown in the drawing, so that the perforations 24b are pushed against the retaining claw 26b.

Instead of the resilient member 28, the outermost periphery of the film roll 24 may be sandwiched by a pair of flanges disposed on the spool 27. Further an annular rib for pressing the outermost periphery of the film roll 24 may be formed on the inner wall of the cartridge body 26.

The above-mentioned cartridge 25 also is used when the developed negative film 24 is returned to the user. However, if a construction for shielding light perfectly is provided to the interior of the cartridge body 26 as in the above-described first embodiment it can be used as a cartridge for containing an unexposed film.

Figure 4:
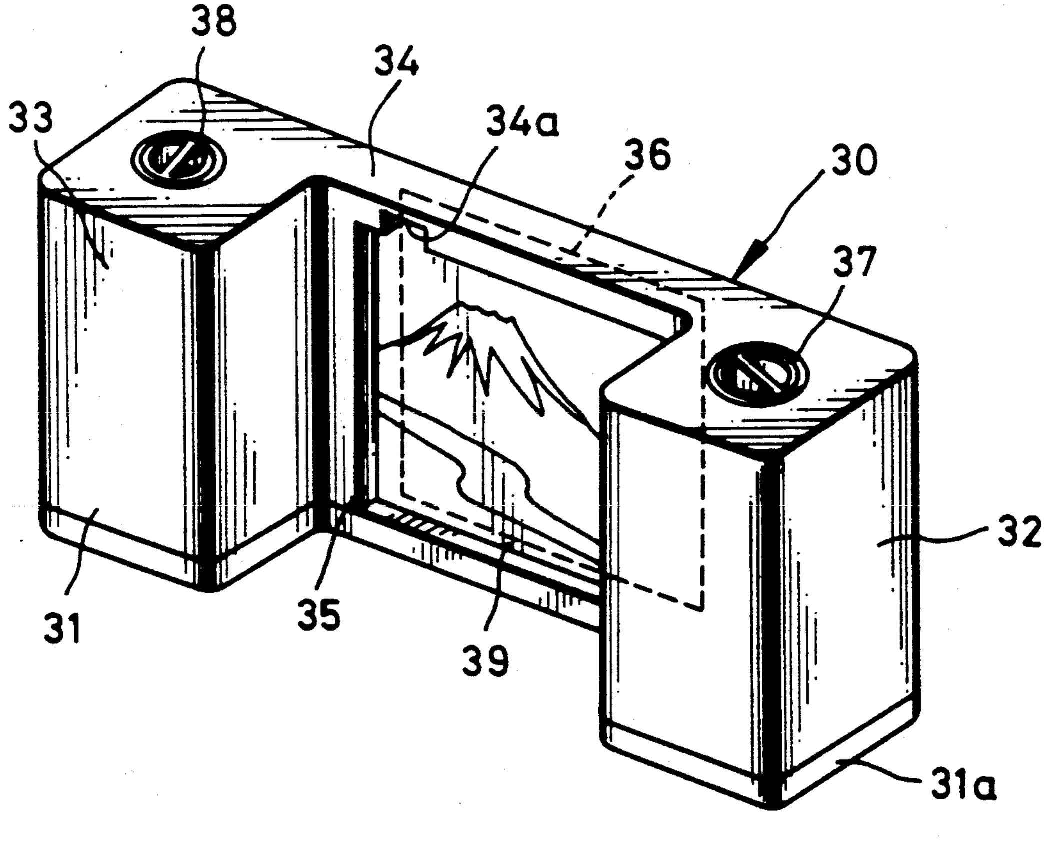
FIG. 4 is a perspective view of a third embodiment of the present invention.

In a third embodiment of the present invention shown in FIG. 4, a cartridge 31 is constituted by first and second roll chambers 32 and 33, and a bridge portion 34 for interconnecting the roll chambers 32 and 33. The bridge portion 34 has a pair of rectangularly shaped apertures 35 and 36 which are formed in each of the front and rear parts of the bridge 34, the shape of the apertures 35 and 36 corresponding to one frame. Roll chambers 32 and 33 rotatably contain spools 37 and 38, respectively. A leader end and a trailer end of the developed negative film 39 are fixed to the spools 37 and 38, respectively. Depending on positions of the first and last picture frames, the leader tape and trailer tape preferably are attached to both ends of the negative film 39.

Since a cap 31a can be fitted removably to a bottom portion of the cartridge body 31, the spools 37 and 38 and the developed negative film 39 wound thereon can be put in and out in the axial direction from the bottom portion of the cartridge body 31. Also, the cartridge 30 containing the developed negative film 39, almost the entire length of which is wound on the spool 37, is returned to the user. At the time the cartridge 30 is returned to the user, it is preferable that the apertures 35 and 36 be covered with a cover member, or that the cartridge 30 be packed in a paper box or in a plastic case.

If such a cartridge 30 is used as a container for storing the developed negative film 39, it is true that the apparent form becomes larger that of the first and second embodiments. However, as the developed negative film 39 can be settled in a single film strip portion and the configuration of the cartridge 30 is a box, arrangement and storage can be made much easier than in the case where the conventional negative film sheath is used, and there is no need to worry about scattering of the negatives. Further, as the developed negative film 39 can be transferred in both directions by rotation of the spools 37 and 38, a desired frame can be found easily by reading the bar code 15 (see FIG. 1) through the notch 34a formed in the bridge portion 34 at the time of extra printing The extra printing also can be performed through apertures 35 and 36.

Figure 5:
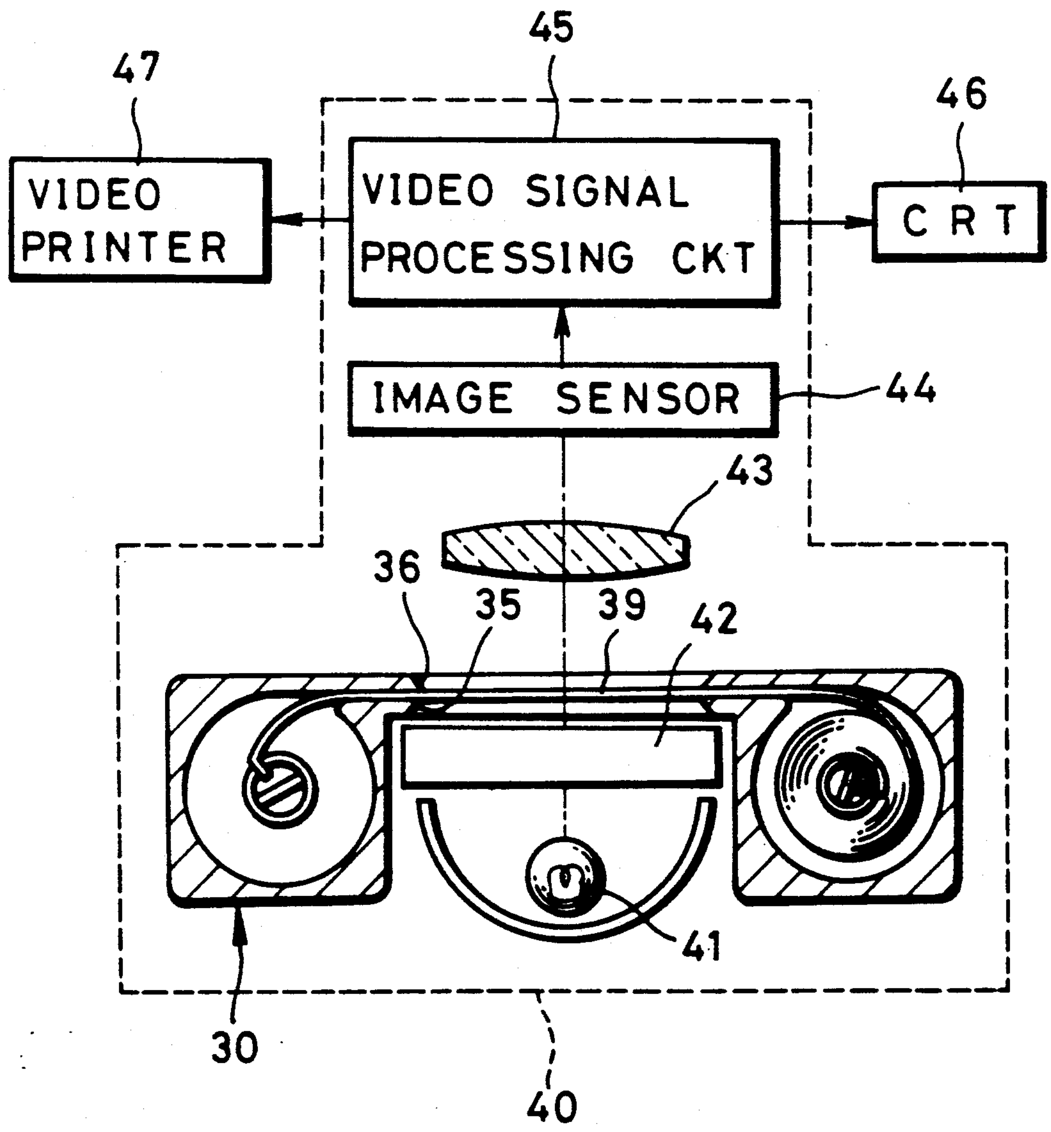
FIG. 5 is a schematic view showing the cartridge of FIG. 4 set in a video player.

As desired frame access is easy, the cartridge 30 can be used advantageously when image observation and video print are performed utilizing a video player 40, as shown in FIG. 5. The video player 40 includes a light source 41 for illuminating a developed negative film 39 through the opening 35, a condenser optical system 42, a lens 43, and an image sensor 44. An image of the developed negative film 39 is formed on the image sensor 44 through the opening 36. A video signal output from the image sensor 44 is supplied to an image signal processing circuit 45, and then is subjected to image processing such as a negative/positive reversal process, amplification, luminance correction, color correction, etc. An image-processed video signal is sent to a CRT 46 to be reproduced thereon. Also, a hard copy can be made by a video printer 47 through the picture frame. In this embodiment, it is also desirable to attach the user's writing seal 8, the ID number seal 9, and the bar code seal 11 as shown in FIG. 1 to the surface of the cartridge body 31. Also, if the cartridge 30 is formed in a light shielding structure it can be used as a container for an unexposed negative film.

Figure 6:
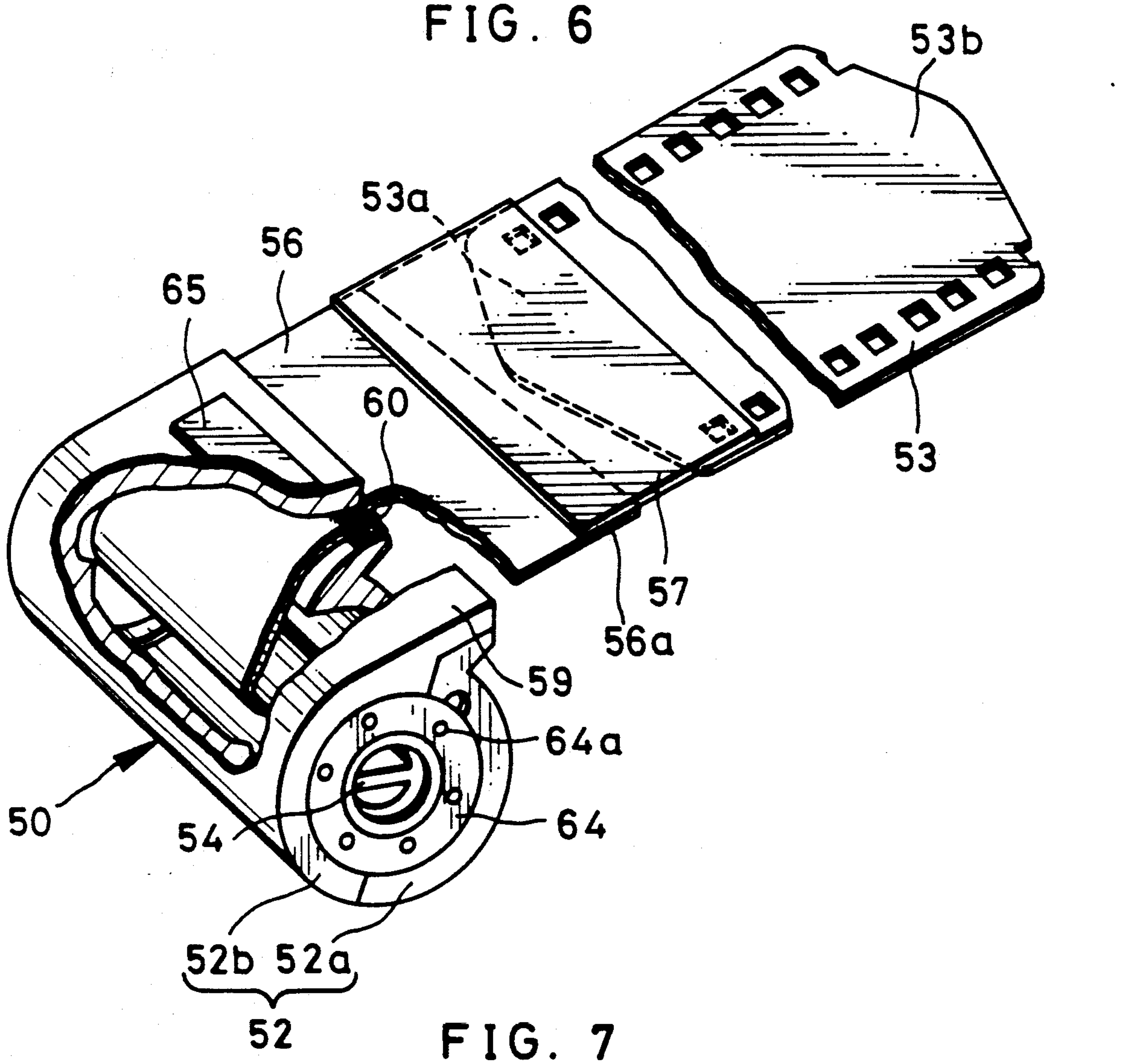
FIG. 6 is a perspective view showing a fourth embodiment of the present invention.
Figure 7:
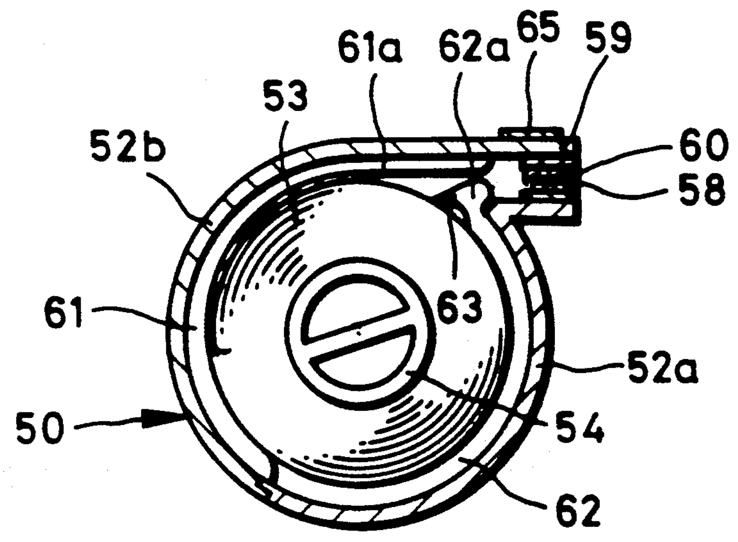
FIG. 7 is a sectional view showing the interior of the fourth embodiment.

FIGS. 6 and 7 show a fourth embodiment of a cartridge in accordance with the present invention, which cartridge can be used to contain both an unexposed negative film and a developed negative film. A light-tight cartridge 50 is constituted by a cartridge body 52 and a spool 54 rotatably contained therein. The cartridge body 52 is constituted by a pair of shells 52*a* and 52*b* which are formed of a light shielding plastic material. A splice tape 56 is employed in this embodiment so that a negative film 53 can be connected easily and conveniently, and the entirety of the negative film 53 can be advanced or drawn outside. A rear end of the splice tape 56 is fixed to the spool 54, a leader section 56*a* thereof being attached with an adhesive tape 57 for attaching a trailer end portion 53*a* of the negative film 53 therewith. The splice tape 56 and adhesive tape 57 have an appropriate amount of resiliency in order to prevent a possible generation of jamming of the splice tape 56 when the negative film 53 is advanced by rotation of the spool 54. A PET (polyethylene telephtalate) having a width of, for example 150 μm to 200 μm, a TAC (triacetate), etc, can be used as the tape. As the connecting work of the negative film 53 is performed outside the cartridge 50, the splice tape 56 has a length sufficient for a tape leader 56*a* to protrude from the cartridge 50.

If an adhesive agent is applied directly to the tape leader 56*a*, the adhesive tape 57 can be omitted. Further, when the exposed negative film is removed, the splice tape may be cut, and when the developed negative film is connected, an adhesive agent such as a hot melt may be applied to the leader section of the splice tape. Also, the design may be such that a hook is formed on the splice 56 and the negative film 53 is provided with a hole in which the hook can fit.

On the cartridge body 52, a port portion 59 having a film passage mouth is formed. Plush 60, for trapping light entering the cassette body 52, is attached to the film passageway in this port portion 59. Also, ring-shaped ribs 61 and 62, which are abutted against the outer peripheral surface of the negative film 53 to prevent the negative film 53 from loosening, are formed on the inner sides of the shells 52*a* and 52*b*, as shown in FIG. 7. Guide ribs 61*a* and 62*a*, which are adapted to guide the leader end 53*b* of the negative film 53 in the direction toward a film passage mouth 58, are formed integrally on each end of the ribs 61 and 62. Also, a separation claw 63 is formed on the guide rib 62*a* on the side interior from the film passage mouth 58. This separation claw 63 is adapted to peel the film leader 53*b* from the outer peripheral surface of the film roll so as to guide the film leader 53*b* to the film passageway when the film roll coiled on the spool 54 is rotated together with the spool 54.

A ring-shaped IC package 64 is attached to the side surface of the cartridge body 52, and data, such as luminance of the object, photographing conditions, trimming information, information as to pseudo telephotography in which an image on the negative film to be printed in enlarged at printing, photograph date, etc. are written on an IC device in the IC package 64 by a data writing device in a camera through a plurality of contacts 64*a*. A label 65 indicating that the negative film 53 contained in the cartridge 50 is undeveloped is attached to the outer surface of the cartridge body 52. This label 65 can be peeled off after the negative film 53 has been developed. Therefore, by checking whether this label 65 is attached, it can be judged whether the negative film 53 contained in the cartridge 50 is developed.

Assembly of the cartridge 50 now will be described. After fixing a rear end of the splice tape 56 to the spool 54, the spool 54 is set in one shell 52*a*. Then, the other shell 52*b* is combined with the shell 52*a*, and contact surfaces of the shells 52*a* and 52*b* are attached by supersonic welding or another method. After assembly of this cartridge 50, the IC package 64 is mounted on the cartridge body 52. In a darkroom, the trailer 53*a* of the unexposed negative film 53 is connected to the splice tape 56 protruded from the film passage mouth 58 through the adhesive tape 57. After the connection, the spool 54 is pivoted counterclockwise in FIG. 6 to wind the negative film 53 into the cartridge 50. Thereafter, the label 65 is attached to the outer surface of the cartridge body 52.

When a photograph is taken the cartridge 50 containing the unexposed film therein is loaded in the camera. Upon rotation of the spool 54, the film roll contained in the cartridge 52 is rotated together with the spool 54, and the film leader 53*b* at the outermost peripheral surface of the film roll is separated by the separation claw 63 and advanced outside the cartridge 50 via the film passage mouth 58. This film leader 53*b*, as is known, is captured by a film take-up spool (not shown) within a film take-up chamber. Thereafter, the negative film 53 is wound on the outer periphery of the film take-up spool. After the first frame portion of the negative film 53 is set behind the exposure aperture, a shutter (not shown) is actuated to expose this frame portion. At the time of this exposure, data such as luminance of the object, photographic conditions, etc. are written on the IC package 64. When a stipulated frame has been taken, the spool 54 is rotated reversely to draw the exposed negative film 53 from the film take-up chamber and to cause the spool 54 to wind the film 53 in the cartridge 50.

A cartridge removed from the camera is submitted to a processing laboratory for developing. At the processing laboratory, the spool 54 is rotated counterclockwise in the darkroom and the leader end 53*a* of the negative film 53 is advanced outside from the passage mouth 58, as described above. Then, the film leader 53*b* is pulled so as to pull out the entire negative film 53 from the cartridge 50 until the adhesive tape 57 appears. Then, the film trailer end of the negative film 53 is peeled off the adhesive tape 57.

Such exposed negative film 53 separated from the cartridge 50 is subjected to processing and printing When printing, data written in the IC package 64 is read and used to establish printing conditions in a photographic printer. After printing the leader end and the trailer end of the developed negative film 53 are cut in an identical configuration, for example V-shape. Owing to the foregoing, regardless of whether the leader end or the trailer end of the negative film 53 is attached to the adhesive tape 57, the negative film 53 can be advanced reliably from the film passage mouth 58 in accordance with rotation of the spool 54. On the other hand when the negative film 53 is processed by one roll as in a miniature laboratory, in order to identify the leader of the negative film 53, the trailer end and the leader end thereof preferably are formed in different configurations.

A negative film already subjected to photographic processing is connected at its trailer end with the adhesive tape 57. When the spool 54 is pivoted clockwise, the negative film 53 is wound into the cartridge 50. It may be designed such that the negative film 53 is wound into the cartridge 50 so that a surface of the negative film 53 with an image appearing thereon is held outside in order to reform the curl of the negative film 53. After the negative film 53 has been wound into the cartridge 50, the label 65 is peeled off the cartridge 50 in order to indicate that a developed negative film is contained therein. Instead of peeling off the label 65, a mark or the like indicating that a negative film contained therein is already developed may be made with a pen. Furthermore, it is preferable that data written on the IC package 64 such as the date of the photograph, is printed on the label 65 in order to facilitate convenient classification and arrangement for the user.

Figure 8:
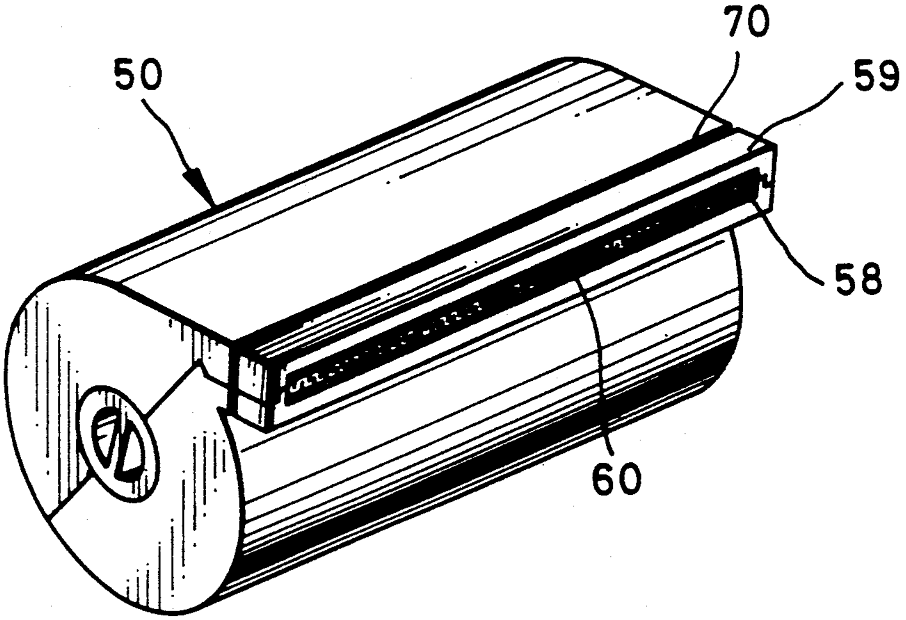
FIG. 8 is a perspective view of the fourth embodiment shown in FIG. 7 and containing an unexposed photographic film.
Figure 9:
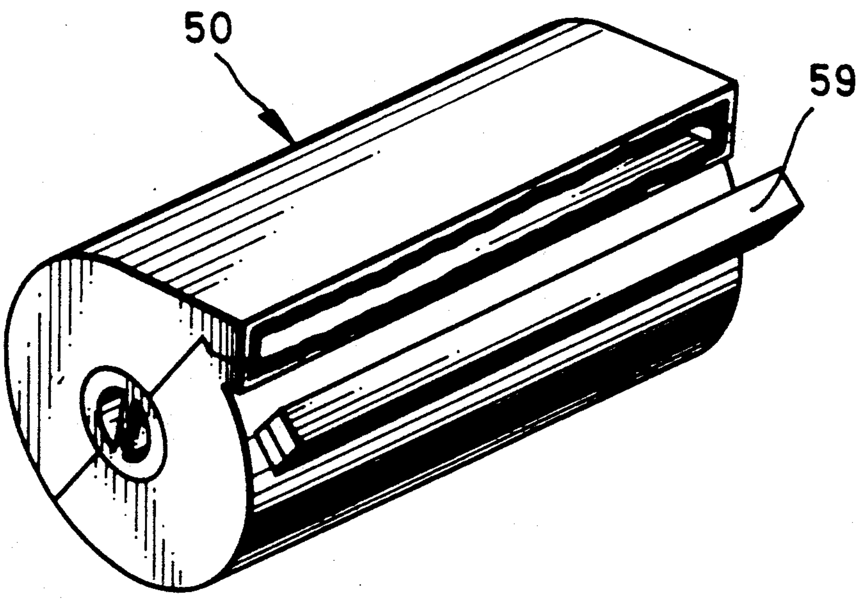
FIG. 9 is a perspective view showing the cartridge containing a developed photographic film.

FIG. 8 shows an embodiment which can indicate whether a negative film contained in a cartridge is already developed simply by peeling off a part of the cartridge. In this embodiment, a cut 70, which is a groove having a thin wall about 0.3 to 0.5 mm thick is formed in shells 52*a* and 52*b* in order to make it easy to cut away the port portion 59. As shown in FIG. 9, the port portion 59 can be separated from the cartridge 50 simply by folding manually along the groove.

In the cartridge 50 constructed as above, it is possible to indicate that a developed negative film 53 is contained in the cartridge 50 simply by removing the port portion 59. Further, since the plush 60 of the film passage mouth 58 also is removed when the port portion 59 is removed, rotating torque of the spool 54 for advancing the negative film 53 outside can be reduced when the extra printing is performed.

The present invention also can contain a reversal film (slide film). Also, it can be used for both 120 type and 135 type film. With the foregoing arrangement, since the processing laboratory may prepare only one kind of cartridges, stock management of cartridges becomes easy.

While the invention has been described above in detail with reference to a particular specific embodiment, various modifications within the spirit and scope of the invention will be apparent to those of working skill in this technological field. Thus, the invention should be considered as limited only by the scope of the appended claims.

What is claimed is:

1. A cartridge for containing a photographic film with perforations formed on both side portions thereof, said cartridge comprising:

- a spool on which said photographic film is wound;
- a cartridge body for rotatably containing said spool;
- a port portion, formed on said cartridge body, and having a film passage mouth, for allowing said photographic film to pass therethrough; and
- a notch, formed in said port portion, for causing said perforations to be exposed therethrough, wherein said photographic film is a developed photographic film, said cartridge storing said developed photographic film.

2. A cartridge as claimed in claim 1, wherein said photographic film has a leader section in which a hole is formed, and wherein said port portion includes a retaining claw for retaining said hole.

3. A cartridge as claimed in claim 2, wherein said cartridge body is transparent.

4. A cartridge as claimed in claim 2, wherein at least one side of said cartridge body has an opening and said spool with said photographic film wound thereon is inserted into said cartridge body through said opening, said cartridge further comprising a cap, with a shaft hole for rotatably supporting one end of said spool, fitted to said one side of said cartridge body.

5. A cartridge as claimed in claim 2, further comprising a seal, having recorded thereon identification information for said photographic film, attached to said cartridge body.

6. A cartridge as claimed in claim 2, further comprising a blank seal, attached to said cartridge, for recording information thereon.

7. A cartridge for containing and keeping a developed photographic film therein, said cartridge comprising:

- a spool for winding said photographic film thereon;
- a cartridge body for rotatably containing said spool;
- a film passage mouth, formed on said cartridge body, for allowing said photographic film to pass therethrough; and
- film advancement means for advancing said leader of said photographic film from said film passage mouth, said film advancement means transmitting rotation of said spool directly to an outermost peripheral surface of said photographic film roll wound on said spool when said spool is rotated.

8. A cartridge as claimed in claim 7, wherein said film advancement means includes means for pressing the outer peripheral surface of said film roll toward the center of said spool.

9. A cartridge as claimed in claim 8, wherein said film advancement means comprises a resilient plate.

10. A cartridge for containing a photographic film therein said cartridge comprising:

- a spool for winding said photographic film thereon;
- a cartridge body for rotatably containing said spool;
- a film passage mouth, formed on said cartridge body for allowing said photographic film to pass therethrough;
- film advancement means for advancing said leader of said photographic film from said film passage mouth, said film advancement means transmitting rotation of said spool directly to an outermost peripheral surface of a roll of said photographic film wound thereon when said spool is rotated; and
- a splice tape for connecting said photographic film, one end of said splice tape being fixed to said spool so that all of said photographic film is pulled out from said cartridge.

11. A cartridge as claimed in claim 10, wherein said photographic film is a developed photographic film, and said cartridge stores said developed photographic film.

12. A cartridge as claimed in claim 11, wherein said cartridge body is transparent.

13. A cartridge as claimed in claim 10, wherein said photographic film is attached peelably to one end of said splice tape.

14. A cartridge as claimed in claim 13, further including an adhesive tape attached to a leader end of said splice tape and to said photographic film.

15. A cartridge as claimed in claim 10, wherein said cartridge body and said spool are opaque.

16. A cartridge as claimed in claim 15, further including an indicator portion, formed on said cartridge body, for indicating whether said photographic film is developed.

17. A cartridge as claimed in claim 16, wherein determination of whether said photographic film is developed is performed by cutting away a portion of said cartridge body.

18. A cartridge as claimed in claim 17, wherein said portion that is cut away is a port portion where said film passage mouth is formed a cut being formed initially in said port portion.

19. A cartridge as claimed in claim 18, wherein one end of said splice tape is attached peelably to said photographic film.

20. A cartridge as claimed in claim 19, further including an adhesive tape attached to a leader end of said splice tape, said photographic film being attached through said adhesive tape.

21. A cartridge for containing and keeping a developed photographic film therein, said cartridge comprising:

a first roll chamber for storing said photographic film in a roll form;

a second roll chamber for winding therein, in said roll form, said photographic film drawn from said first roll chamber;

a bridge portion interconnecting said first and second roll chambers;

an aperture, formed in said bridge portion, for allowing front and rear surfaces of a single picture frame, recorded on said photographic film, to be exposed therethrough;

two rotatable shafts, disposed within said first and second roll chambers respectively, ends of said photographic film being fixed through leader tapes to respective ones of said rotatable shafts;

a seal, having recorded thereon identification information for said photographic film, attached to said cartridge body;

a blank seal, attached to said cartridge, for recording information therein; and a notch formed in said bridge portion.

22. A cartridge as claimed in claim 21, wherein said notch allows identification information related to a desired frame to be exposed.

* * * * *